(12) United States Patent
Green et al.

(10) Patent No.: US 12,610,964 B2
(45) Date of Patent: Apr. 28, 2026

(54) COOKED CARAMEL COMPOSITIONS AND RELATED FOOD PRODUCTS

(71) Applicant: General Mills, Inc., Minneapolis, MN (US)

(72) Inventors: Daniel R. Green, Minnetonka, MN (US); Katia Severova-Epp, Apple Valley, MN (US); Jazmine N. Gosey, Minneapolis, MN (US); Joel R. Lafavor, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 331 days.

(21) Appl. No.: 17/956,107

(22) Filed: Sep. 29, 2022

(65) Prior Publication Data

US 2023/0016707 A1 Jan. 19, 2023

Related U.S. Application Data

(62) Division of application No. 14/731,121, filed on Jun. 4, 2015, now Pat. No. 11,470,854.

(51) Int. Cl.
*A23G 3/32* (2006.01)
*A21D 13/28* (2017.01)
(Continued)

(52) U.S. Cl.
CPC .............. *A23G 3/343* (2013.01); *A21D 13/28* (2017.01); *A23G 3/32* (2013.01); *A23G 3/40* (2013.01);
(Continued)

(58) Field of Classification Search
None
See application file for complete search history.

(56) References Cited

U.S. PATENT DOCUMENTS

| 2,122,016 | A | 6/1938 | Stokes |
| 3,094,947 | A | 6/1963 | Green et al. |

(Continued)

FOREIGN PATENT DOCUMENTS

| EP | 05702252 | 11/1993 |
| EP | 11516i76 | 11/2001 |

(Continued)

OTHER PUBLICATIONS

Barra, Guiseppina The Rheology of Caramel, Thesis submitted to the University of Nottingham for the degree of Doctor of Philosophy, Chapter 2, Literature Review, Feb. 2004, pp. 5-11.
(Continued)

*Primary Examiner* — Lien T Tran
(74) *Attorney, Agent, or Firm* — Jordan IP Law, LLC; John L. Crimmins, Esq.

(57) ABSTRACT

Cooked and uncooked caramel slurries and products prepared using the cooked caramel slurries, and methods of preparing caramel slurries and coating a cooked caramel slurry onto a food piece. A process of providing a cooked caramel slurry comprises providing a slurry comprising sucrose, non-sucrose sugar, fat, water and protein, and having an initial total moisture content of at least 6 weight percent moisture and cooking the slurry in a closed cooking system that does not allow moisture to leave the slurry during cooking. A cooked caramel slurry comprises from 30 to 80 weight percent sucrose, from 5 to 25 weight percent non-sucrose sugar, from 5 to 25 weight percent fat, and from 0.1 to 5 weight percent protein, each on a total solids (dry) basis, and at least 5 weight percent water, wherein the slurry is undiluted, the water being also present during cooking of the slurry.

15 Claims, 3 Drawing Sheets

(51) Int. Cl.

| | |
|---|---|
| *A23G 3/34* | (2006.01) |
| *A23G 3/40* | (2006.01) |
| *A23G 3/42* | (2006.01) |
| *A23G 3/44* | (2006.01) |
| *A23G 3/54* | (2006.01) |
| *A23L 7/122* | (2016.01) |
| *A23L 7/161* | (2016.01) |
| *A23P 20/10* | (2016.01) |

(52) U.S. Cl.
CPC ................. *A23G 3/42* (2013.01); *A23G 3/44* (2013.01); *A23G 3/54* (2013.01); *A23L 7/122* (2016.08); *A23L 7/161* (2016.08); *A23P 20/10* (2016.08); *A23V 2002/00* (2013.01)

(56) References Cited

U.S. PATENT DOCUMENTS

| | | | |
|---|---|---|---|
| 3,246,990 | A | 4/1966 | Thompson et al. |
| 3,464,827 | A | 9/1969 | Tsuchiya et al. |
| 3,582,336 | A | 6/1971 | Rasmussen |
| 3,600,193 | A | 8/1971 | Glabe et al. |
| 3,687,687 | A | 8/1972 | Liepa |
| 3,903,308 | A | 9/1975 | Ode |
| 3,976,793 | A | 8/1976 | Olson et al. |
| 4,101,680 | A | 7/1978 | Edwards |
| 4,927,645 | A | 5/1990 | Lee |
| 5,024,848 | A | 6/1991 | Little |
| 5,149,558 | A | 9/1992 | Little et al. |
| 5,384,148 | A | 1/1995 | Lynch et al. |
| 5,395,623 | A | 3/1995 | Kovach |
| 5,505,982 | A | 4/1996 | Krawczyk et al. |
| 5,709,902 | A | 1/1998 | Bartolomei et al. |
| 5,962,061 | A | 10/1999 | Ter Braak |
| 6,103,283 | A | 8/2000 | Zukerman et al. |
| 6,291,008 | B1 | 9/2001 | Robie et al. |
| 6,391,356 | B1 | 5/2002 | Willcocks et al. |
| 6,419,979 | B1 | 7/2002 | Nelson et al. |
| 6,475,540 | B1 | 11/2002 | Howling et al. |
| 6,773,734 | B2 | 8/2004 | Sirohi et al. |
| 6,824,808 | B2 | 11/2004 | Best et al. |
| 2003/0044488 | A1 | 3/2003 | Roskam et al. |
| 2005/0089618 | A1 | 4/2005 | Bernard et al. |
| 2006/0110493 | A1 | 5/2006 | Schnieber et al. |
| 2006/0286212 | A1 | 12/2006 | Yu |
| 2008/0026111 | A1 | 1/2008 | Bellody, Jr. et al. |
| 2009/0061069 | A1 | 3/2009 | Warnecke et al. |
| 2009/0148562 | A1 | 6/2009 | Lin et al. |
| 2012/0003360 | A1 | 1/2012 | Barrett et al. |
| 2012/0090602 | A1 | 4/2012 | Zhang et al. |
| 2012/0090603 | A1 | 4/2012 | Dunne et al. |
| 2013/0071523 | A1 | 3/2013 | Barrett et al. |
| 2014/0017346 | A1 | 1/2014 | Bernard et al. |
| 2015/0359242 | A1* | 12/2015 | Avashia ................. A23L 29/30 426/573 |

FOREIGN PATENT DOCUMENTS

| | | |
|---|---|---|
| EP | 1245581 | 10/2002 |
| GB | 1259074 | 1/1972 |
| SU | 1558369 | 4/1990 |
| WO | WO 2003/068000 | 8/2003 |

OTHER PUBLICATIONS

Savory Lotus, "*Sweetened Condensed Coconut Milk*", https://www.savorylotus.com/sweetened-condensed-coconut-milk-a-dairy-free-alternative, pp. 1-19, Nov. 2013.

* cited by examiner

COOKED CARAMEL COMPOSITIONS AND RELATED FOOD PRODUCTS

CROSS-REFERENCE TO RELATED APPLICATIONS

This application represents a divisional application of U.S. patent application Ser. No. 14/731,121 entitled "Cooked Caramel Compositions and Related Food Products" filed Jun. 4, 2015, Now U.S. Pat. No. 11,470,854. The entire content of this application is incorporated herein by reference.

FIELD OF THE INVENTION

The following description relates to cooked and uncooked caramel slurries, methods of preparing caramel slurries and coating a cooked caramel slurry onto a food piece, and caramel slurry-coated food pieces and products.

BACKGROUND OF THE INVENTION

Caramel is a light brown, often chewy, sweet confection typically made from sugar, milk, corn syrup, fat, and water. Caramel, such as in the form of caramel candy pieces, can be made by combining milk and fat with a sugary syrup (e.g., corn syrup), then heating and stirring the mixture to allow the ingredients to cook to a desired light or dark brown color. During cooking, the ingredients react to achieve a desired coloration, flavor, and aroma that are characteristic of caramel. To form the distinctive caramel flavor and coloration, the ingredients undergo what are referred to as a Maillard reaction, a Caramelization reaction, or both. These non-enzymatic reactions take place with heating, between two sugar molecules or between a sugar molecule and a protein molecule. The Maillard reaction is between amino groups in protein and a reducing sugar, while the Caramelization reaction is between two sugar molecules and does not involve an amino group. The Maillard and Caramelization reactions provide the flavor, aroma, and brown coloration that are distinctly associated with caramel. After the caramel ingredients are cooked to produce a desired texture, consistency, and coloration, the mixture of cooked ingredients can be cooled and formed into caramel candy pieces or combined with another food product to add a caramel flavor.

Because caramel is well-liked, various non-candy food products are made to include caramel. Many such non-candy caramel-flavored foods are prepared by applying a caramel composition to a surface of a food piece as a caramel coating. The caramel coating can be made from the same ingredients used to prepare a caramel candy, and then coating the caramel onto a food piece as a slurry at elevated temperature.

A standard method of preparing a caramel slurry for coating onto a food piece is by combining caramel ingredients typically used for preparing caramel, including water, to form an uncooked caramel ingredient slurry, and then cooking the slurry at a boiling temperature of the slurry to cause the Maillard and Caramelization reactions (the "cooking reactions"). The slurry is cooked for a time sufficient to allow the cooking reactions to progress as desired, while water is removed by boiling. Typical commercial processes involve preparing an uncooked slurry of caramel ingredients that include water, and cooking the slurry at ambient pressure and a temperature that brings the slurry to a boil for a time sufficient to react the ingredients to produce a cooked caramel slurry having the distinctive flavor, aroma, and brown color of caramel, while also removing a large portion of the water by boiling.

Regarding water removal, the cooking typically occurs by adding sufficient heat energy to the slurry to cause the slurry to boil so that water boils out of the slurry until the slurry takes on a relatively thick consistency. The cooked caramel slurry is generally heated with boiling to reduce the moisture content to below about 4 percent, e.g., to a level a range from about 2 to about 3 weight percent water based on total slurry weight. The caramel slurry having this low moisture content will exhibit a viscosity and a consistency that may allow the slurry to be coated onto a food piece, but not in an ideal fashion because the relatively high viscosity limits the manner by which the cooked caramel slurry can be applied to a food piece. For example, even with heating, the slurry can be too viscous to allow application of the slurry to a food piece by spraying. Instead, a typical low-moisture, viscous cooked caramel slurry can be applied to a food piece by limited techniques, such as by enrobing, tumbling, pouring, or dripping the heated cooked slurry onto a food product. These coating techniques are useful but not ideal in that they are known to produce a generally un-even, non-uniform caramel coating on a food piece surface.

SUMMARY OF THE INVENTION

The food industry continues to research novel methods and materials for producing new or known types of food products. The following description relates to methods and compositions for preparing a cooked caramel slurry having a relatively high moisture content, and applying the cooked caramel slurry as a coating onto a food piece. In the past, caramel coatings have been applied to food products in the form of a low-moisture, high viscosity cooked caramel slurry. The slurry is normally prepared by methods that boil most of the water out of the slurry during a cooking process that caramelize sugar ingredients and produces a low-moisture content, high-viscosity cooked caramel slurry. The cooked caramel slurry typically has a moisture content that is not greater than about 4 percent by weight (e.g., from about 2 to 3 weight percent moisture), based on total weight slurry.

Previous, conventional high-viscosity, low moisture cooked caramel slurries can be applied using only certain limited types of coating equipment and methods that are capable of processing high viscosity, low moisture slurries. Those methods include tumbling, enrobing, dripping, and the like, all of which are not known to produce substantially uniform and even coatings. The high-viscosity, low-moisture cooked caramel slurries are too thick to be applied by spray-coating or other techniques that would produce an even, uniform caramel coating.

A different effect of applying the low-moisture coating onto a food product is that when the coated low-moisture cooked caramel slurry is dried and cooled, it normally exhibits a relatively low sucrose crystallinity (the amount of sucrose that is in crystalline form, relative to total sucrose), e.g., below 8 or 10 percent crystalline sucrose.

The following description relates to new and inventive methods and new and inventive caramel slurry compositions, and their uses. The methods involve producing a cooked caramel slurry having a relatively higher moisture content compared to typical previous cooked caramel slurries, without the need to dilute the slurry by adding water after cooking and before applying the slurry to a food piece. The cooked caramel slurry contains a relatively higher moisture content compared to conventional cooked caramel slurries, e.g., a moisture (i.e., water) content of at least about 5, 6, 7, 8, or 10 weight percent moisture, preferably in a range from 10 to 20 weight percent moisture, more preferably from about 12 to about 18 weight percent moisture, based on total slurry weight.

It is known that a relatively higher moisture content slurry might be prepared by diluting a lower moisture content cooked caramel composition, i.e., by adding moisture back to a lower moisture content cooked caramel composition. But an added step of dilution is commercially undesirable as adding cost and complexity. Slurries and methods as described herein can be useful to prepare a relatively higher moisture content cooked caramel slurry without the need to add moisture back to the slurry after cooking. The present methods produce an undiluted higher moisture content cooked caramel slurry by fully cooking a slurry of caramel ingredients in a manner that retains a higher amount of water during cooking, while still producing a completely cooked caramel slurry. Preferred higher moisture content slurries can be cooked to a degree (e.g., as measured by coloration) that is expected in a cooked caramel slurry, and can have a viscosity that allows application of the undiluted slurry to a food piece by a range of coating techniques, including by spraying.

As a first and preferred example of a described method for preparing a cooked caramel slurry having a relatively high moisture content, e.g., at least about 5 or 6 weight percent moisture, preferably at least 10 weight percent, a caramel slurry may be cooked in a closed system, meaning a system that does not allow water to leave the slurry during cooking and that optionally becomes pressurized during cooking to greater than ambient pressure. The use of a closed system allows cooking to a cooked caramel slurry while preventing moisture loss during cooking. A resulting cooked caramel slurry can have a moisture content that is the same as the moisture content of the slurry before cooking, such as at least 5 of 6 weight percent, preferably 10 weight percent or greater, without being diluted after cooking by adding water back to the cooked caramel slurry. The undiluted cooked caramel slurry can be applied directly to a food piece without the need for added liquid (e.g., water) to reduce the slurry viscosity after cooking and before applying the cooked slurry to a food piece.

As another example of a method as described, for preparing a cooked caramel slurry having a relatively high moisture content, e.g., at least about 5 or 6 weight percent moisture, preferably at least 10 weight percent moisture, a caramel slurry may be prepared by a method that includes a step of cooking the slurry at a temperature that is below the boiling point of the slurry, at ambient (e.g., atmospheric) pressure, in an open (i.e., non-pressurized) cooking system, for a time sufficient to produce a cooked caramel slurry without reducing the moisture content to below about 5 or 6 weight percent, preferably not below 10 weight percent. An ambient pressure (open) cooking step at below the boiling point of the slurry may take additional time relative to a cooking step that uses a higher temperature to boil the slurry to remove most of the water from the slurry, but the open cooking step can be useful to cook the slurry to the same degree while retaining a greater amount of water in the slurry to facilitate coating the slurry to a food piece. A process for preparing a cooked caramel slurry that includes this type of an ambient pressure (open) cooking step at below the boiling point of the slurry may also include the use of a concentrator that heats the slurry above its boiling point to remove a portion of the water from the slurry and form a concentrated slurry, prior to the ambient pressure (open) cooking step. A resulting cooked caramel slurry can have a moisture content that is reduced but similar to the moisture content of the slurry before cooking, such as at least 5 or 6 weight percent or greater, preferably at least 10 weight percent, and does not require dilution after cooking by adding water back to the cooked caramel slurry. The undiluted cooked caramel slurry can be applied directly to a food piece without the need for added liquid (e.g., water) to reduce the slurry viscosity after cooking and before applying the cooked slurry to a food piece.

Examples of cooked caramel slurries as described herein, having a relatively higher moisture content, can exhibit a viscosity that is relatively lower than previous, comparable, conventional slurries, while also being cooked to a comparable degree. The lower viscosity allows for improved handling and for a greater range of coating techniques to be used for coating the cooked caramel slurry onto a food piece, including by spray coating, which is not a usual option for higher-viscosity, lower moisture content, cooked caramel slurries. The broadened selection of coating method options can allow for application of a cooked caramel slurry coating onto a food piece with good coating uniformity and evenness.

A viscosity of a cooked caramel slurry can be sufficiently low to allow the cooked caramel slurry to be applied to a food piece by a range of coating methods, including by spraying. Exemplary viscosities can be, for example, in a range that is below about 2500 centipoise, e.g., less than 2000 centipoise, as measured using a TA Instruments AR-G2 Rheometer (fitted with 40 millimeter parallel plate geometry on a peltier plate temperature control, being run at a shear rate of 10 $sec^{-1}$ and reading the viscosity at 30 seconds), at 200 degrees Fahrenheit.

A cooked caramel slurry as described can be cooked to a degree of cooking that is similar to previous cooked caramel slurries, while still exhibiting a relatively moisture content and relatively lower viscosity property as described. As one measure of a desirable, useful, or preferred degree of cooking, a cooked caramel slurry can be measured to exhibit coloration that is expected of a caramel material, ranging from light brown to dark brown, depending on factors that may include the type of product and consumer preference.

A separate potential feature of a higher-moisture-content cooked slurry as described is that upon drying, the coated slurry can exhibit desirably increased sucrose crystallinity relative to a coating formed from an otherwise similar lower-moisture content cooked caramel slurry. Caramel coatings prepared from otherwise similar lower-moisture-content slurries (e.g., slurries having less than 4 weight percent moisture based on total weight slurry) can typically dry to form a dried caramel coating having a sucrose crystallinity that is not greater than 10 percent (meaning that only 10 percent of the total amount of sucrose in the dried slurry coating is in the form of crystalline sucrose, the balance being generally amorphous sucrose). According to presently-described coatings and methods, a caramel slurry prepared to exhibit a higher-moisture content (e.g., a slurry having a moisture content of at least 5 or greater weight percent, based on total weight slurry) can be dried to form a dried cooked caramel coating having a sucrose crystallinity that is at least 15, 20, or 30 percent (meaning that at least 20 or 30 percent of the total amount of sucrose in the dried slurry coating is in the form of crystalline sucrose, the balance being generally amorphous sucrose).

If desired, the level of sucrose crystallinity can be increased even above these levels by methods and techniques intended to produce still higher levels of sucrose crystallinity in the dried slurry. For example, according to certain embodiments, sucrose seed particles can be applied to a food piece along with the relatively higher-moisture content cooked caramel slurry. Sucrose seed particles may be applied, for example, as a component of a sweet oil that contains crystalline sucrose particles (e.g., powdered sugar particles) in a liquid oil. The sucrose particles of the sweet oil act as seed particles (or nucleation sites) that result in an increased level of total sucrose crystals in a dried caramel slurry coating, upon drying of the cooked caramel slurry in the presence of the seed particles. According to some embodiments, a relatively high moisture content cooked caramel slurry applied to a food piece in the presence of sucrose seed particles can be dried to form a dried cooked caramel coating having a sucrose crystallinity that is at least 40, 50, 60, 70, or 80 percent.

As additional background, it is known that a form of caramel can be prepared by placing a can of condensed milk in boiling water, without opening the can, and leaving the can in the boiling water for a matter of hours, such as at least 2 or 3 hours. Such a method may increase the pressure of the condensed milk contents of the can during cooking, to above atmospheric pressure. The presently described slurry compositions and related methods are different from these methods, as will be discernible from the following description.

In one aspect, the invention relates to a cooked caramel-coated food piece composition. The composition contains about 40 to about 95 weight percent food piece, and about 5 to about 60 weight percent cooked caramel coating over at least a portion of the food piece. The cooked caramel coating has sucrose crystallinity of greater than 10 percent.

In another aspect the invention relates to an undiluted cooked caramel slurry. The slurry includes: from 30 to 80 weight percent sucrose, from 5 to 25 weight percent non-sucrose sugar, from 5 to 25 weight percent fat, and from 0.1 to 5 weight percent protein (each on a total solids (dry) basis); and at least 5 weight percent water. The slurry is undiluted, the water being also present during cooking of the slurry.

In another aspect the invention relates to a process of providing a cooked caramel slurry. The process includes: providing a slurry containing sucrose, non-sucrose sugar, fat, and protein, and having a moisture content of at least 6 weight percent moisture; and cooking the slurry in a closed cooking system to produce a cooked caramel slurry having a moisture content approximately the same as the moisture content of the pre-cooked slurry.

In yet another aspect the invention relates to a process of providing a cooked caramel slurry. The process includes providing a slurry containing: sucrose, non-sucrose sugar, fat, and protein, and having a moisture content of at least 6 weight percent moisture; and cooking the slurry at ambient pressure at a temperature below the boiling point of the slurry to produce a cooked caramel slurry having a moisture content of at least 5 percent.

In yet another aspect, the invention relates to a process of coating a cooked caramel slurry onto a food piece. The process includes: providing a food piece, a cooked caramel slurry, and sucrose seed particles; coating the seed particles onto the food piece, and coating the cooked caramel slurry onto the food piece.

DETAILED DESCRIPTION OF INVENTION

Figure 1:
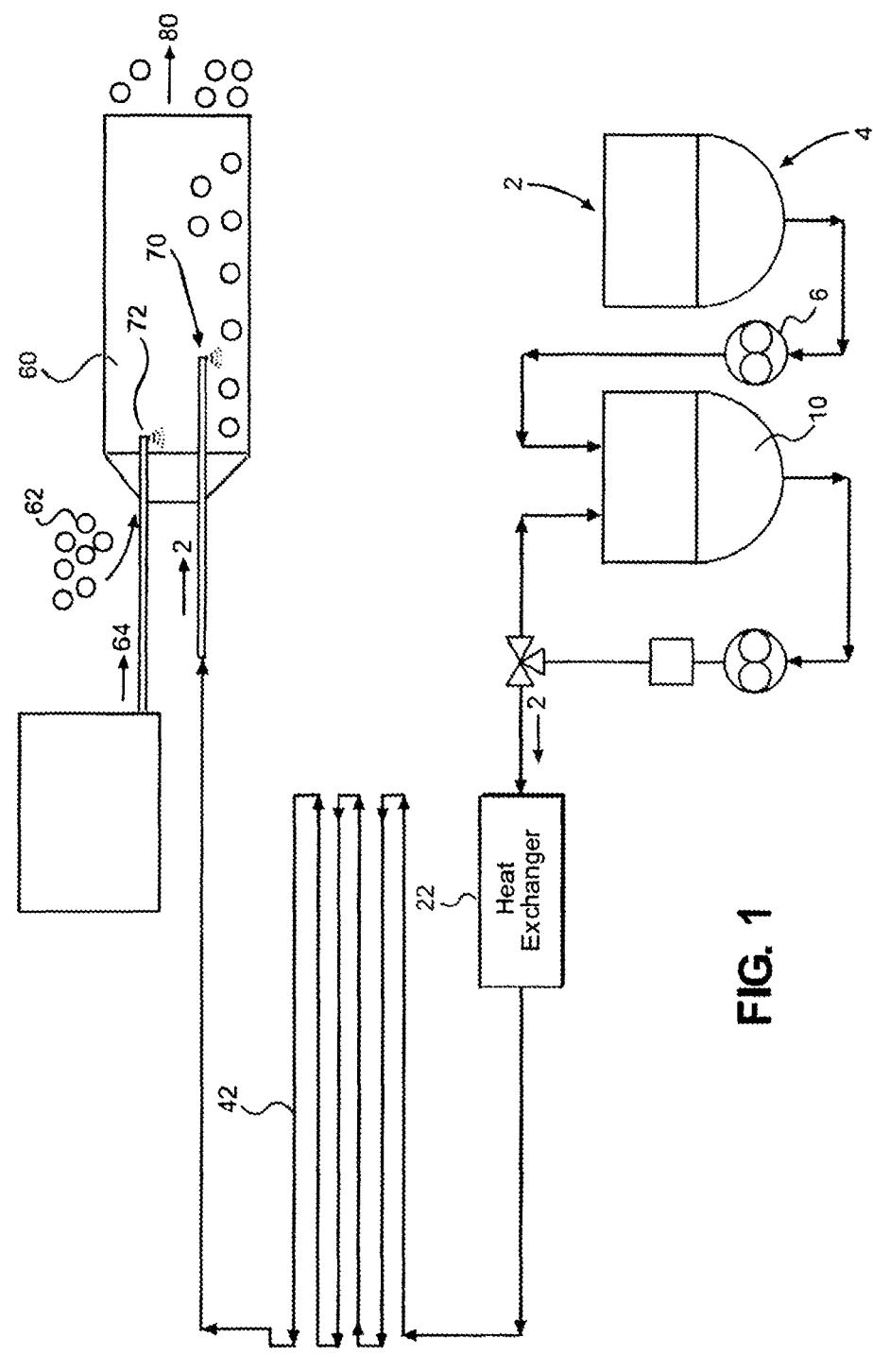
FIG. 1 shows exemplary process steps for preparing a cooked caramel slurry as described.

As used in the following description the term "caramel," as in caramel coating, caramel slurry, etc., is to be given a meaning that is consistent with the meaning that this term is given and understood to convey within the food and candy arts.

Consistent with its understood meaning, the term "caramel" refers to a brown-colored, sweet-tasting edible confection having distinctive brown coloration, typically a thick, often sticky, sometimes brittle, chewy texture, and a characteristic caramel flavor and aroma. To achieve the color, flavor, and aroma that are characteristic of caramel, it is prepared by controlled cooking of a mixture of ingredients that includes sugars, fat, and protein, with water. The particular types of sugars, fat, and protein can vary among specific types that are commonly used in the production of caramel, often including butter; sucrose; non-sucrose mono and di-saccharide-containing ingredients such as molasses or corn syrup; and usually milk or a milk product as a protein source, such as cream or a condensed milk product. Optionally, one or more of the usual caramel ingredients or a portion thereof may be replaced with a useful substitute, but in a manner to still produce a cooked caramel having expected caramel coloration, flavor, and aroma. The caramel ingredients are combined and processed by cooking in a manner that causes a Maillard browning reaction as well as what is generally referred to as a Caramel reaction or caramelization, these reactions being responsible for reacting sugar and protein molecules to produce reaction products having the light to dark brown color of caramel, and caramel flavor and aroma. These cooking reactions can proceed with heating of the composition, typically to boiling at ambient pressure. As sugar molecules are heated they can break down and re-form into compounds with the colors and flavors characteristic to caramel. Also with heating, proteins (e.g., from a source of milk protein) can react with sugars according to what is referred to as the Maillard reaction, also producing reaction products that result in a brown color expected in caramel.

More particularly, according to at least one source (Barra, Guiseppina "The Rheology of Caramel, Thesis submitted to the University of Nottingham for the degree of Doctor of Philosophy, February 2004, Chapter 2, Literature Review), caramel is a complex emulsion of a dispersed phase of fat globules and a highly concentrated sugar solution in which non-fat milk solids and other minor components are dispersed or dissolved, having common characteristics that include: a continuous syrup structure that holds the confection together; mil, protein dispersed within the syrup; a characteristic flavor produced by the Maillard reaction between milk protein and reducing sugars of the ingredients; fat emulsified into the syrup; and sugar crystals dispersed in the syrup. According to the same source, a general composition of caramel can include from 65 to 70 percent sugar solids, from 5 to 20 percent water, from 5 to 20 percent fat, from 5 to 10 percent milk solids, and from 0.5 to 4 percent protein. (These amounts can be useful for preparing a caramel as described herein, but are not required, meaning that compositions that include amounts of ingredients outside of these specific ranges are also contemplated as part of the novel compositions and methods described herein.)

The following description relates to methods and compositions useful to prepare an uncooked caramel slurry, and to heat and cook the uncooked caramel slurry to form a cooked caramel slurry having a relatively high moisture content, without the need to dilute the cooked slurry with added water. This description also relates to food products that contain a cooked caramel slurry, such as in the form of a coating of the slurry on a food piece, the coating optionally being applied to the food piece and then dried on a surface of the food piece.

The uncooked caramel slurry contains sucrose, non-sucrose sugar, protein, and water, in amounts that are useful to form caramel with cooking. These constituents can be included in a mixture of caramel slurry ingredients, each as a separate ingredient in a pure or concentrated form, such as pure or concentrated sucrose granules, pure or concentrated non-sucrose sugar granules, pure or concentrated non-sucrose sugar syrup, a concentrated protein ingredient, etc. Commonly, the sucrose, non-sucrose sugar, protein, and water can alternately or additionally each be contained as a constituent of an ingredient that contains two or more of these constituents. For example, the slurry ingredients normally include some form of milk protein. Water, may be added by itself as pure water (liquid or ice), or may be part of an ingredient such as milk, condensed milk, as part of a sugar solution (e.g., a sucrose-and-water solution), or as part of a fat or protein ingredient such as butter or eggs. Usually, some form of milk solids or liquid milk product is included to provide milk proteins and sugars that result in characteristic caramel flavor or aroma.

The slurry ingredients can contain any useful amount of sucrose, which can be added to the other caramel slurry ingredients in any useful form, such as in the form of a substantially dry sucrose ingredient made of solid sucrose such as granulated sugar, powdered sugar, etc. Alternately or in addition, an amount of sucrose may first be combined with water or added along with water or another liquid ingredient such as sweetened condensed milk or a sugar solution. A total amount of sucrose in an uncooked caramel slurry (from any ingredient that contains sucrose) can be an amount in a range from 30 to 80 weight percent sucrose, e.g., from 35, 40, or 50, up to 70 weight percent sucrose, based on total uncooked caramel slurry solids (i.e., on a dry basis).

The relative amount of sucrose to other soluble solids (including non-sucrose sugar, but not including insoluble fat or protein) can be as desired, usually including a majority (i.e., at least 50 percent by weight) of sucrose on a total sugar basis, and a majority of sucrose relative to total soluble solids. As used herein, the term "sucrose ratio" refers to the amount of sucrose in a slurry relative to the total amount of soluble solids in the slurry. In certain embodiments, the uncooked slurry (i.e., the combined uncooked slurry ingredients, before cooking) can include relative amounts of sucrose, non-sucrose soluble solids, and other soluble solids, such that the sucrose ratio is in a range from about 0.5 or 0.6 to 0.85, e.g., from about 0.7 to 0.8. The slurry, after partial or complete cooking and after being applied to a food piece, can also contain these relative amounts of sucrose and non-sucrose soluble solids, and a ratio of amounts of these ingredients within the specified ranges.

The slurry ingredients can contain non-sucrose sugar in a useful amount. Non-sucrose sugar can provide subtle sweet flavors that are slightly different from the sweet flavor of sucrose, that are distinctive to caramel, and can additionally contribute to Maillard browning. A non-sucrose sugar can include a sugar other than sucrose, many examples of which are known within the food and confectionary arts; these usually include mono-saccharides, non-sucrose disaccharides, and oligo-saccharides, specifically including fructose, glucose, galactose, maltose, and lactose.

A non-sucrose sugar can be added to the other caramel slurry ingredients in the form of a dry ingredient made of solid (dry) non-sucrose sugar such as a granulated non-sucrose sugar ingredient. Alternately, non-sucrose sugar may also be first combined with water or another liquid ingredient. Examples of non-sucrose sugar ingredients include non-sucrose sugar syrups such as corn syrup, high-fructose corn syrup, refiners syrup, molasses, honey, and the like.

The total amount of non-sucrose sugar in the uncooked caramel slurry (from any ingredient or combination of ingredients that contain non-sucrose sugar) can be any useful amount. Examples of useful amounts according to some embodiments of caramel slurries can be in a range from 5 to 25 weight percent non-sucrose sugar, preferably from 10 to 20 weight percent non-sucrose sugar, based on total slurry solids (i.e., on a dry basis). The slurry, after partial or complete cooking and after being applied to a food piece, can also contain an amount of non-sucrose sugar that is within the specified ranges.

According to certain uncooked slurry embodiments, non-sucrose sugar can be included as a high solids-containing, low moisture, sugar syrup, e.g., refiners syrup, corn syrup, high fructose corn syrup, or as a combination of two or more such syrups. Such sugar syrups are well known and take the form of flowable liquids that contain a low amount of water (e.g., less than 5, 2, or 1 weight percent moisture based on total weight syrup) and concentrated amounts of sugar, especially mono- and di-saccharides such as fructose. The syrup may contain a low amount of sucrose, but may be referred to herein as a non-sucrose sugar ingredient even if a syrup contains a small amount of sucrose. According to exemplary slurry embodiments, a sugar syrup such as corn syrup, high fructose corn syrup, refiners syrup, or a combination of these, may be present in the uncooked slurry in an amount in range from about 5 to 25 weight percent sugar syrup based on total slurry solids, preferably from about 10 to about 20 weight percent sugar syrup based on total slurry solids. The slurry, after partial or complete cooking and after being applied to a food piece, can also contain an amount of sugar syrup that is within the specified ranges.

The slurry ingredients can contain a useful amount of fat, which provides expected caramel texture and flavor. The fat can be added to the other caramel slurry ingredients in the form of a concentrated or pure fat ingredient such as an oil (containing a low amount of water, e.g., less than 5, 2, or 1 weight percent water based on the weight of the oil). Additionally or alternately, fat may be a component of a slurry ingredient that contains other constituents, such as cream, butter, milk, condensed milk, etc.

The fat can be any of a large variety of edible fats that are known to be useful in the food and confectionary arts. The fat ingredient is understood to contain a highly concentrated amount of triglycerides, which may be derived from any suitable source, may be natural or synthesized, and may be processed as desired by any of purification, hydrogenation, fractionization, interesterification, etc., which are known processes of processing fats and oils.

Fats that can be particularly useful for a caramel slurry as described herein can be liquid at a consumption temperature and above (or at room temperature and above), e.g., liquid at a temperature of 50, 60, or 70 degrees Fahrenheit and above.

Exemplary fats can include hydrogenated, partially-hydrogenated, and fully hydrogenated (in part) oils, interesterified oils, and fractionated oils, including those derived from plant and animal sources, especially from soybean, safflower, sunflower, sesame, peanut, corn, olive, palm, cottonseed, poppyseed, rapeseed, and the like. An uncooked caramel slurry can contain a single type of fat or a combination of two or more fats. Fat can be included in a mixture of slurry ingredients as a concentrated or substantially pure fat ingredient (e.g., palm oil, soy oil, cottonseed oil, etc.) or as a combination of two or more concentrated or pure fat ingredients. Alternately or in addition, an amount of fat can be included in a mixture of slurry ingredients by being present as a constituent of an ingredient that includes fat along with other constituents such as water, protein, or sugar (sucrose or non-sucrose), e.g., as a butter ingredient or a milk product ingredient.

In exemplary embodiments, a total amount of fat in an uncooked caramel slurry (from any ingredient or ingredients that contain fat) can be an amount in a range from 5 to 25 weight percent fat, preferably from 5 to 20 weight percent fat, based on total slurry solids.

According to embodiments of uncooked caramel slurries that include fat as a constituent of butter or oil, the slurry can contain butter or oil in an amount in a range from 5 to 30 weight percent butter or oil based on total weight solids (i.e., on a dry basis) of an uncooked caramel slurry, preferably from 5 to 25 weight percent butter or oil based on total weight solids in an uncooked caramel slurry (i.e., on a dry basis). The slurry, after partial or complete cooking and after being applied to a food piece, can also contain an amount of butter or oil (in a dry basis) that is also within the specified ranges.

The uncooked caramel slurry ingredients can also contain protein in any useful amount. Protein, especially milk protein, is included to provide expected caramel texture and flavor and to provide amino acid molecules that participate in the Maillard browning reaction. The protein can be added to the other caramel slurry ingredients in the form of a pure or concentrated (e.g., liquid or powdered) protein ingredient, or as a constituent of a slurry ingredient that includes protein and other constituents, such as a powdered or liquid milk ingredient (e.g., condensed or sweetened condensed milk), milk solids, eggs, powdered eggs, etc. More generally, protein can be provided as a constituent of a protein source ingredient such as milk or a milk product (including any milk derivative such as evaporated, condensed, powdered milk, etc.), eggs, powdered eggs, hydrolyzed gelatin, non-hydrolyzed gelatin, soy protein, whey protein, caseinate, collagens, vegetable protein, fish protein, egg protein, and animal protein.

To produce the expected flavor, aroma, and color of caramel, preferred slurry ingredients can contain a milk product as a protein source. The milk product can be any of a variety of known and suitable milk products including whole milk, skim milk, 1% milk, 2% milk, condensed or evaporated milk (whole, skim, or in-between), condensed sweetened milk, dried milk (whole, skim, etc.), milk solids, whey protein, whey protein concentrate. Examples of these types of milk products are known and commercially available, and contain a combination of water (other than the dried or powdered ingredients), and milk solids that usually include some amount of milkfat, sugars, and milk protein. A sweetened whole condensed milk, for example, may contain from about 35 to about 50 weight percent sugars and a from about 25 to about 35 weight percent moisture (water). According to certain slurry and method embodiments, a useful or preferred protein source can be a dairy product such as sweetened condensed milk, which can be useful to increase the rate at which slurry ingredients cook to form a cooked caramel by accelerating the Maillard reaction to result in a relatively shorter total cooking time.

Useful amounts of total protein in exemplary uncooked slurry ingredients can be in a range from about 0.1 to 5 weight percent protein (e.g., milk protein) based on total weight uncooked caramel slurry, preferably from 0.25 to 4 weight percent protein (e.g., milk protein) based on total weight uncooked caramel slurry solids (i.e., on a dry basis). The slurry, after partial or complete cooking and after being applied to a food piece, can also contain an amount of protein that is within these specified ranges.

According to embodiments of uncooked caramel slurries that include a condensed milk product as a protein source, e.g., sweetened condensed milk, the slurry ingredients can contain a milk solids in an amount in a range from 5 to 25 weight percent milk solids based on total weight solids in an uncooked caramel slurry (i.e., on a dry basis), preferably from 7.5 to 20 weight percent milk solids based on total weight solids in uncooked caramel slurry. The slurry, after partial or complete cooking and after being applied to a food piece, can also contain an amount of milk solids that is within the specified ranges.

The uncooked caramel slurry can contain water in a useful amount, such as an amount that allows the slurry to be handled and processed by cooking to produce desired cooking reactions between the ingredients, to produce a cooked caramel slurry. The water can be combined with other slurry ingredients as pure water, or as a constituent of a different ingredient that contains water in combination with one or more of sugar, protein, or fat. In specific, water may be present in any one or more of a milk product ingredient, butter, eggs, in a sugar syrup ingredient, as solvent in a solution of water and sucrose or non-sucrose sugar, or as a component of a different ingredient that contains protein, fat, or sugar.

The total amount of water in an exemplary uncooked slurry can be in a range from 10 to 30 weight percent, preferably from 15 to 20 or 25 weight percent water based on total slurry weight.

Optionally, an uncooked caramel slurry can also contain emulsifier to facilitate the formation of a cooked caramel slurry or a cooked caramel coating. A useful emulsifier can be of a type presently known, or of a type developed at a future time, for use in food products, candies, and confections, including caramel. Examples include lecithin and mono and diglycerides. Emulsifier can be included in any useful amount, such as in an amount in a range less than about 2 weight percent based on total solids of an uncooked slurry.

Other minor ingredients may also be included in an uncooked caramel slurry, such as salt, preservatives, and color. These can be included in any useful amount, such as below 2 weight percent or below 1 weight percent based on total slurry solids.

Once slurry ingredients are selected, the slurry ingredients can be combined to prepare the uncooked caramel slurry (i.e., the mixture of ingredients prior to cooking). Combining slurry ingredients can be accomplished by standard combining and mixing steps with standard commercial mixing equipment. The uncooked slurry made from the combined ingredients can in turn be processed by heating, i.e., cooking, at temperature and pressure conditions that will cause desired reaction of the ingredients to produce a cooked caramel slurry by exposing the slurry to time and temperature conditions that will cause a Maillard browning reaction, caramelization, or both.

According to the present description, cooking a caramel slurry can include a process at least a portion of which involves cooking the slurry in a manner that does not cause water to boil off to result in a level of water loss that is similar to previous methods of preparing a caramel slurry for coating onto a food piece, e.g., previous methods that produce a cooked caramel slurry having below 4 weight percent water. Cooking processes as described herein can be sufficient to form a cooked caramel slurry having characteristic caramel properties—i.e., by cooking to achieve a desired degree of Maillard browning, desired caramel color, flavor, and aroma—but without causing the usual high degree of water loss that occurs by use of conventional methods of boiling a slurry to produce a cooked caramel slurry. An advantage of a cooked caramel slurry with relatively moisture content is that the slurry can be processed more easily or effectively than an otherwise comparable lower moisture content slurry, because the higher moisture content slurry will exhibit a lower viscosity. Another advantage is that a higher water content in a cooked caramel slurry allows the slurry to be coated and dried to form a dried slurry coating having a relatively higher sucrose crystallinity compared to a coating formed from an otherwise comparable slurry with a lower moisture content.

Exemplary methods can produce an undiluted cooked caramel slurry having a moisture content that facilitates coating of the cooked caramel slurry onto a substrate (e.g. food piece) as a uniform coating, without the need for and preferably excluding a step of adding water (or another liquid) to the cooked slurry after cooking and before coating. In specific, methods and compositions as described relate to cooked caramel slurries that are prepared to be applied to a food piece, without the need for a dilution step after cooking, at a higher moisture content compared to previous slurries. The methods described herein for preparing the slurry allow for cooking of caramel ingredients to produce a cooked caramel composition (i.e., a completely cooked caramel slurry having Maillard browning and Caramelization as expected of a cooked caramel slurry) but while still controlling and maintaining a relatively high moisture content of the slurry.

Accordingly, a cooked caramel slurry as described herein can exhibit a relatively higher moisture content compared to conventional slurries cooked in an open cooking system at a temperature that causes a large portion of water initially in the slurry to be boiled out of the slurry during cooking. An exemplary moisture content of a cooked caramel slurry as described herein, after cooking and without adding any water after cooking, can be at least 5 weight percent water based on total slurry weight, for example at least about 5, 6, 7, 8, or 10 weight percent water, preferably from 10 to 20 weight percent water, more preferably from about 12 to about 18 weight percent water based on total weight slurry.

According to a preferred method of preparing a cooked caramel slurry with relatively higher moisture content, a slurry can be cooked in a closed system that retains moisture in the slurry during cooking. A closed cooking system can allow cooking at greater than ambient pressure, optionally at or above an atmospheric temperature boiling point of the slurry, and in some embodiments with cooking to a desired coloration in a reduced amount of time. Using a closed cooking system, desired moisture content of the slurry can be selected before the closed cooking step; because moisture is retained in the slurry during cooking the final moisture content of the cooked slurry is the same as the initial moisture content. Because the moisture content of the slurry can be selected and does not change during cooking, the degree of browning and cooking of the slurry can be selected and controlled by independently choosing and controlling the time and temperature parameters of the closed cooking step.

Certain efficiencies can result from a closed system cooking step. For example, preventing evaporation of water during a closed cooking step prevents energy (heat) loss that would occur with the evaporation of heated water. The reduced energy loss can result in a reduced amount of time required to raise the temperature of the slurry from an ambient temperature to a cooking temperature. Also, the pressurized system can allow the use of a higher cooking temperature, optionally allowing for a reduced amount of time for the cooking step.

Temperature, pressure, and time conditions useful in this type of a closed-system cooking step can be as desired to produce a useful cooked caramel slurry, e.g., as measured by coloration. By way of non-limiting example, useful temperatures may be in a range from about 240 to 310 degrees Fahrenheit, preferably from about 260 to 300 degrees Fahrenheit; the temperature will be below the boiling temperature at the operating pressure. Useful pressures of a closed system cooking step can be greater than one atmosphere (absolute), such as from about 2 to about 6 atmospheres (absolute), preferably from about 3 to about 5 atmospheres pressure (absolute).

A slurry can be cooked using the closed system cooking step for a time necessary to cook the slurry to a desired degree, e.g., as measured by coloration. For example, using temperature ranges as described, a slurry may be cooked in a closed system cooking step for a time in a range of from 2 to 20 minutes, preferably from 4 to 12 minutes, more preferably from 6 to 8 minutes. In any particular cooking step or desired cooked caramel slurry, the time needed for a desired level of cooking in a closed system will depend on the temperature; a lower temperature will require a longer cooking time. The closed system cooking step can be performed using a batch, semi-batch, or continuous process.

In a closed system cooking step, the moisture content of the cooked slurry will be the same as the moisture content of the slurry at the start of the closed system cooking step. The slurry before cooking can be selected to have a moisture content in a range from 6 to 20 weight percent, preferably from 10 to 20 weight percent, more preferably from 12 to 18 weight percent based on total slurry weight. The cooked slurry, after the closed system cooking step, will contain the original amount of moisture.

Described methods that include using a closed-system cooking step can be useful or advantageous for multiple reasons compared to open-system cooking steps that operate by boiling the slurry to remove large amounts of water and produce a relatively low moisture cooked caramel slurry. One potential feature of a closed-system cooking step is process efficiency in terms of time and energy used. By using a closed system cooking step for at least portion of the total amount of cooking of a caramel slurry, the total amount of time and energy required to cook the slurry to produce a desired degree of cooking (e.g., as measured by coloration) can be reduced relative to amounts of time and energy required for a similar degree of cooking in an open system.

According to preferred embodiments of the described methods, an example of which is shown at FIG. 1, a cooking system can include steps of combining slurry ingredients in a mixer; optionally using a heat exchanger or other heating apparatus to increase the temperature of the slurry after the mixer; cooking the slurry using a closed (i.e., pressurized) cooking step to form a cooked caramel slurry without moisture loss; and applying the slurry to a food piece. Referring to FIG. 1, slurry ingredients 2 (also referred to as slurry 2) can be as described herein and can include an amount of water as described, such as up to about 20 or 30 weight percent moisture. As illustrated, slurry ingredients 2 can be added to mixer 4, mixed to uniformity, and optionally held for a desired time period before being passed (e.g., using pump 6) to a second mixing tank or mixing-and-holding tank 10. Slurry ingredients 2 (now slurry 2) can be held and continuously removed from tank 10 and delivered to (optional) heater or heat exchanger 22. In heater or heat exchanger 22, slurry 2 is heated at a temperature and pressure (e.g., ambient, approximately atmospheric), and for a time useful to increase the temperature of slurry 2 to a temperature at which the subsequent closed system cooking step will occur, such as to a temperature in a range from about 240 to about 310 degrees Fahrenheit, such as from about 260 to 300 degrees Fahrenheit. From heater or heat exchanger 22, slurry 2 passes to closed cooking vessel 42, which contains slurry 2 during a closed cooking step at a temperature and pressure, and for a time, useful to produce a cooked caramel slurry without moisture loss.

While residing in closed cooking vessel 42, a useful cooking temperature may be in a range from about 240 to about 310 degrees Fahrenheit, such as from about 260 to 300 degrees Fahrenheit. The amount of time slurry 2 spends in closed cooking vessel 42 can be sufficient to produce a desired amount of cooking of the slurry, e.g., as measured by coloration. For example, using temperature ranges as described, slurry 2 may be cooked in a closed cooking vessel 42 for a time in a range of from 2 to 20 minutes, preferably from 4 to 12 minutes, more preferably from 6 to 8 minutes, although specific cook times can depend on the type of product, desired coloration, and temperature of the closed cooking step.

After cooking in closed cooking vessel 42, slurry 2 may have a moisture content that is the same as the moisture content of slurry 2 before cooking, such as a moisture content in a range from 6 to 20 weight percent, e.g., from 10 to 20 weight percent, or from 12 to 18 weight percent based on total slurry weight.

After cooking as desired, cooked caramel slurry 2 passes to applicator 60, which may be any useful applicator such as a tumbler, enrober, spray coater, or other type of coater or slurry applicator apparatus. Food pieces 62 are introduced to applicator 60, optionally, and as illustrated, along with sucrose seed particles 64. As illustrated, food pieces 62 are continuously placed into applicator 60. Sucrose seed particles 64 are (optionally, continuously) applied, e.g., by spraying from spray nozzle 72 as part of a sweet oil as described herein. Cooked caramel slurry 2 is also applied (optionally, continuously) to food pieces 62, before or after seed particles 64, by spraying slurry 2 from spray nozzle 70. Coated food pieces 80, of food piece 62 coated with cooked slurry 2 and optional seed particles 64, exit (e.g., continuously) applicator 60 and can be further processed as desired, such as by drying cooked slurry 2 to remove water and reduce the water content of slurry 2 to a level below 3 or 2 percent moisture.

According to certain alternate embodiments of useful processes to prepare a relatively high moisture content cooked caramel slurry, a closed system cooking step is not required, but an ambient cooking step may also be useful. Methods of preparing a relatively higher moisture content cooked slurry do not require a closed system but can also be performed in an open system in a manner that cooks the caramel slurry while allowing water to be retained in the slurry, without undue loss of water. These can include cooking at an ambient pressure, at which the cooking temperature is limited by the boiling point of the slurry. Because the cooking temperature is limited (cannot exceed the boiling point), the amount of time needed for a desired amount of cooking will increase relative to a cooking step carried out using a closed system. But an ambient pressure cooking step can still be used to produce a cooked caramel slurry having a relatively high moisture content (e.g., 5 or 6, preferably at least 10 percent by weight), which can be applied to a food piece by spraying and which can be dried to a level of sucrose crystallinity that can be greater than dried coatings produced by drying a cooked slurry having a lower moisture content.

In specific embodiments, a cooked caramel slurry as described can be prepared by using an ambient pressure cooking step that cooks the slurry at a temperature that is at or below the boiling point of the slurry, without causing excessive water loss due, e.g., without causing the slurry to lose moisture by boiling. In these embodiments, a slurry is cooked at ambient pressure (e.g., atmospheric pressure, for example pressure in a range from about 0.8 or 0.9 to about 1.1 or 1.2 atmosphere pressure, absolute) at a temperature that is at or below the ambient pressure boiling point of the slurry, for a time sufficient to allow the slurry ingredients to react to produce a cooked slurry that is completely cooked, e.g., to a desired coloration, while also retaining moisture to have a moisture content after cooking of at least 5 or 6 percent, preferably greater than 10 percent based on total weight slurry. By cooking the slurry at a temperature that is at or below the boiling point of the slurry, while avoiding high levels of water loss due to boiling, the ambient pressure cooking step can produce a fully cooked caramel slurry with a higher level of retained moisture. The process can be sufficient to add an amount of heat energy to the slurry that is effective to produce a desired cooked caramel slurry, but without excessive water loss. Preferably, an ambient pressure cooking step can take place at ambient (e.g., atmospheric) pressure conditions in a container (e.g., kettle) that uses a cover to hold in and prevent the loss of most of the water that might otherwise evaporate from the slurry, but in a manner that does not increase the pressure within the container to substantially above ambient pressure.

By way of non-limiting example, useful temperatures of an ambient pressure cooking step may be below the boiling point of a caramel slurry, which is often a boiling temperature of about 290 degrees Fahrenheit. Preferred temperatures for an ambient pressure cooking step may be below the boiling point of the slurry, for example, in a range from about 240 to about 290 degrees Fahrenheit, more preferably from about 250 to 285 degrees Fahrenheit.

The amount of time required for an ambient pressure cooking step can be sufficient to provide a cooked caramel slurry having a water content in a range from about 6 to 15 weight percent moisture (based on a weight of the total slurry) preferably from about 6 to 12 weight percent moisture. The amount of time can also produce desired coloration for a fully cooked slurry based on the desired product type and consumer color preference. Coloration may be used as a useful endpoint of a cooking step, with a desired end coloration being a coloration that is expected of a particular type of caramel product and based on consumer preference.

Examples of useful periods of time for an ambient pressure cooking step can be in a range from about 30 to 80 minutes, e.g., from 40 to 60 minutes.

The starting slurry that is cooked using an ambient pressure cooking step may be an uncooked slurry as described, or a concentrated slurry. An uncooked slurry refers to a slurry prepared directly from caramel slurry ingredients as described herein, that has experienced not more than an insubstantial amount of heating and cooking. The uncooked slurry may have a high moisture content, e.g., a moisture content in a range from about 15 to 30 percent, such as from 15 to 25 percent based on total slurry weight.

A concentrated slurry refers to a slurry prepared directly from slurry ingredients as described herein and that is subsequently heated in a manner to remove a substantial portion of the water of the original slurry ingredients to produce a concentrated slurry having a lower water content (relative to the original slurry ingredients) and a higher solids content. Such a concentrating step can also necessarily cause a degree of cooking in the slurry, but not complete cooking. In a step of concentrating a slurry, the slurry (e.g., uncooked or partially cooked) can initially have a relatively high moisture content, e.g., a moisture content in a range from about 15 to 30 percent, such as from 15 to 25 percent based on total slurry weight. The step of concentrating the uncooked slurry can reduce the water content substantially, such as to a water content in a range from 6 to 15 percent water, e.g., from 6 to 12 percent water based on the total weight of the slurry.

A step of concentrating a caramel slurry can take place in any desired and useful manner and using any selected equipment, including equipment commercially available for uses that include removing water from a water-containing slurry to concentrate the slurry. The concentrating step can be performed using a batch, semi-batch, or continuous process. The time and temperature parameters of a concentrating step can be selected to remove a desired amount of water from a slurry, starting from the initial water content of the slurry. Desirably, the concentrator operates at a relatively high temperature, at ambient (e.g., approximately atmospheric) pressure, in a manner to rapidly remove a portion of the water from the slurry in a short amount of time, such as under 15, 10, or 5 minutes. A temperature useful for concentrating a slurry can be a temperature at which the slurry will boil in the concentrator, e.g., the boiling point of the slurry at ambient (e.g., atmospheric) pressure, which can generally be about 290 degrees Fahrenheit.

Figure 2:
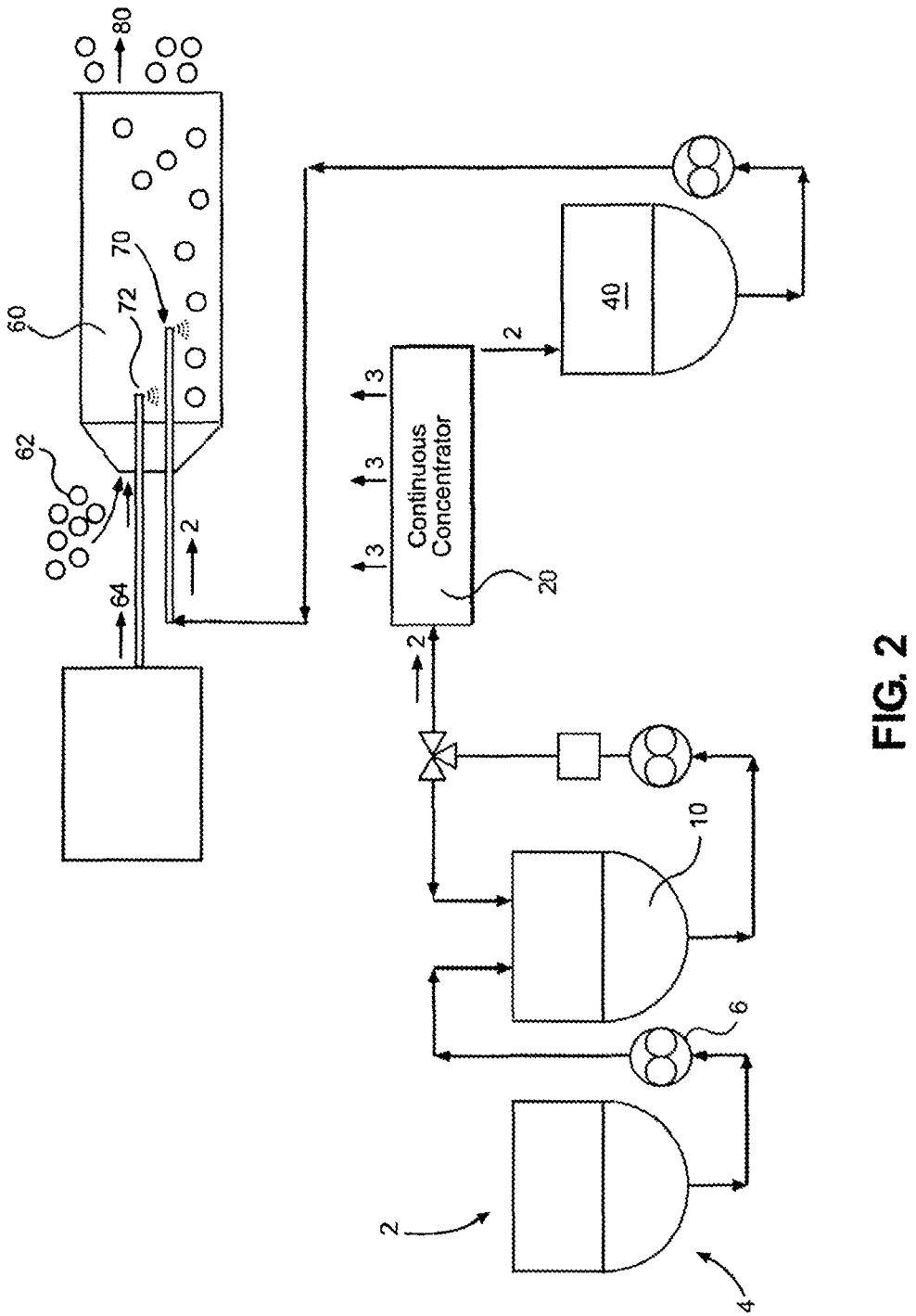
FIG. 2 shows exemplary process steps for preparing a cooked caramel slurry as described.

Referring to FIG. 2, illustrated is an example of a cooking system that includes steps of combining slurry ingredients in a mixer; concentrating the slurry ingredients in a concentrator; cooking the slurry ingredients in an ambient cooking step, without boiling, to form a cooked caramel slurry; and applying the slurry to food pieces. Slurry ingredients 2 (also referred to as slurry 2) can be as described herein and can include an amount of water as described, such as up to about 20 or 30 weight percent moisture. As illustrated, slurry ingredients 2 can be added to mixer (e.g., continuous stirred tank) 4, mixed to uniformity, and optionally held for a desired time period before being passed (e.g., using pump 6) to a second mixing tank (e.g., continuous stirred tank) or mixing-and-holding tank 10. Slurry ingredients 2 (now slurry 2) can be held and continuously removed from tank 10 and delivered to concentrator 20, illustrated as (but not necessarily) a continuous concentrator. In concentrator 20, slurry 2 is heated at a temperature and pressure (e.g., ambient, approximately atmospheric), and for a time useful to remove a substantial amount of the water (3) from the slurry, e.g., to remove 10, 20, 30, 40, or 50 percent of the water initially present in slurry ingredients 2 added to mixer 4. The resultant concentrated slurry 2, exiting concentrator 20, can contain an amount of water in a range from 6 to 15 percent water, preferably from 6 to 12 percent water.

Preferably, the amount of time needed to remove a desired amount of water (3) from slurry 2 using concentrator 20 can be less than 15, 10, or less than 5 minutes.

Also during heating in the concentrator, the temperature of slurry 2 increases to a temperature that is at or somewhat above a temperature at which a subsequent ambient pressure cooking step will occur. For example, to remove water from slurry 2, concentrator 20 generally operates at a temperature of the boiling point of slurry 2, which is often a temperature of about 290 Fahrenheit, slightly above a subsequent ambient pressure cooking step.

As shown a FIG. 2, from concentrator 20, slurry 2 (having a reduced water content) passes to open cooking vessel (e.g., continuous stirred-tank reactor or CSTR) 40, which contains slurry 2 (with reduced water content) during an ambient pressure cooking step at a temperature that is below the boiling point of slurry 2. While residing in open cooking vessel 40, a useful cooking temperature can be a temperature that does not produce boiling of slurry 2, e.g., that is below the boiling point (measured at ambient pressure) of slurry 2, e.g., in a range from about 240 to about 290 degrees Fahrenheit (but below or at the slurry boiling point), such as from about 250 to 285 degrees Fahrenheit.

The amount of time slurry 2 spends in vessel 40 can be sufficient to cook slurry 2 to a desired coloration, with examples being from about 30 to 80 minutes, preferably from 40 to 60 minutes.

During this open system, ambient pressure cooking step, water may be lost from slurry 2, but the amount of water that is lost can desirably be controlled to an amount that is less than 20 percent, e.g., less than 10 or less than 5 percent of the amount of water that is present in slurry 2 before the open system, ambient pressure cooking step. Alternately stated, the amount of water in slurry 2 after the ambient pressure cooking step can be at least 80 percent, e.g., at least 90 percent or at least 95 percent of the amount of water in slurry 2 as slurry 2 leaves concentrator 20. Accordingly, the amount of water in slurry 2 after the open system cooking step in vessel 40 can be an amount in a range from about 6 to 15 weight percent moisture (based on a weight of the total slurry), preferably from about 6 to 12 weight percent moisture.

Still referring to FIG. 2, after cooking as desired, cooked caramel slurry 2 passes to applicator 60, which may be any useful applicator such as a tumbler, enrober, spray coater, or other type of coater or slurry applicator apparatus. Food pieces 62 are introduced to applicator 60, optionally, and as illustrated, along with sucrose seed particles 64. As illustrated, food pieces 62 are continuously placed into applicator 60. Sucrose seed particles 64 are (optionally, continuously) applied, e.g., by spraying from spray nozzle 72 as part of a sweet oil as described herein. Cooked caramel slurry 2 is also applied (optionally, continuously) to food pieces 62, before or after seed particles 64, by spraying slurry 2 from spray nozzle 70. Coated food pieces 80, of food piece 62 coated with cooked slurry 2 and optional seed particles 64, exit (e.g., continuously) applicator 60 and can be further processed as desired, such as by drying cooked slurry 2 to remove water and reduce the water content of slurry 2 to a level below 3 or 2 percent moisture.

Generally, any conventional processing apparatus and techniques can be used to apply a cooked caramel slurry to a food piece or to otherwise incorporate the cooked caramel slurry into a food product. Examples of useful coating techniques include tumbling, enrobing, curtain coating, dripping, spray coating, and the like.

Advantageously, because a cooked caramel slurry prepared according to the present description can exhibit a relatively high moisture content (e.g., at least 5 or 6 weight percent, preferably at least 10 percent moisture based on total slurry weight), which in turn results in a desirably low viscosity, a relatively wider range of coating techniques is available for applying the cooked caramel slurry to a food piece compared to comparable cooked caramel slurries having lower moisture content. Examples of available coating techniques that can be available for coating higher moisture content cooked slurries include spraying, curtain coating, and other types of coating techniques that may not necessarily be suitable for applying higher viscosity slurries.

Within the present description, the terms "spraying" or "spray coating" are used to refer to methods of applying a liquid onto a substrate surface (such as a food piece) by pressurizing the liquid and passing the liquid through a nozzle (e.g., aperture, opening, or orifice), the liquid exiting the nozzle into an lower (e.g., ambient) pressure environment in a manner that causes the liquid to be propelled from the nozzle and dispersed into airborne liquid particles that can be directed to become placed onto food piece surfaces. For coating a cooked caramel slurry as described, the size of the nozzle and the pressure used to cause the liquid to pass through the nozzle and become dispersed as airborne liquid particles upon exiting the nozzle can be any useful nozzle size and pressure differential. An example of a useful pressure differential across the nozzle can be from 20 to 100 pounds per square inch (gauge). A desirable feature of embodiments of dried slurries as described, which can result from the relatively higher moisture content of a cooked caramel slurry when applied as a coating onto a food piece, then dried, is a relatively high sucrose crystallinity as compared to the sucrose crystallinity of a dried cooked caramel slurry coating derived from a similar slurry having a lower moisture content when applied to a food piece and dried.

Sucrose crystallinity in a dried cooked caramel slurry is the amount of sucrose in the dried slurry that is in a crystalline form relative to the total amount of sucrose in the dried cooked caramel slurry (crystalline, amorphous, or otherwise). Previous dried cooked caramel slurries have been known to have a sucrose crystallinity in a range of less than 10 percent, often less than 8 percent (crystalline sucrose per total sucrose). This relatively low sucrose crystallinity is a result (at least in large part) of the low moisture content of the cooked caramel slurry as it is coated onto a food piece, then dried. The low moisture content causes the slurry to dry in a manner that results in the sucrose remaining substantially in an amorphous state, with only a small portion of the sucrose achieving a crystalline state.

In contrast, a cooked caramel slurry coating as described herein, containing a relatively higher amount of moisture when applied to a food piece and dried, can dry in a manner that allows a greater amount of sucrose to attain a crystalline form, increasing the relative amount of sucrose in the dried coating that is crystalline, and reducing the amount of the sucrose that dries to an amorphous form. In specific, a caramel slurry prepared to exhibit a relatively high moisture content (e.g., a slurry having a moisture content of at least 5 or 6 weight percent, preferably at least 10 percent, based on total weight slurry) can be dried to form a dried cooked caramel coating having a sucrose crystallinity that is at least 20, 30, 35, or 40 percent.

Moreover, if desired, the level of sucrose crystallinity can be increased even above these levels by use of methods and techniques designed to cause still higher levels of sucrose crystallinity in a dried coating of a cooked caramel slurry coating. For example, according to certain embodiments, sucrose seed particles can be applied to a food piece along with a relatively high moisture content cooked caramel slurry. (Details of the use of sucrose seed particles are presented below.) According to some such embodiments, a relatively high moisture content cooked caramel slurry applied to a food piece in the presence of sucrose seed particles can be dried to form a dried cooked caramel coating having a sucrose crystallinity that is at least 40, 50, 60, 70, or 80 percent.

Sucrose seed particles can be incorporated into a cooked caramel slurry, during coating of the slurry onto a food product, to increase the sucrose crystallinity of a dried cooked caramel slurry coating. The sucrose seed particles can be sucrose granules, e.g., powdered sucrose granules, that are applied before, during, or after the cooked caramel slurry is applied to a food piece, but before the cooked caramel slurry is dried. The sucrose seed particles can be in the form of a dry powder, or, in specific embodiments, incorporated into a "sweet oil" composition that includes a mixture or slurry containing fat (e.g., oil) and sucrose crystals.

A "sweet oil" is a coating material that includes fat such as an oil, and sucrose, with at least a portion of the sucrose being in crystalline form. In exemplary embodiments a majority of the sucrose in a sweet oil can be in crystalline form, such as at least 50 percent, 60 percent, 70 percent, 80 percent, or 90 percent (solids by weight) of a total amount of sucrose in a sweet oil can be in crystalline form when the sweet oil is applied to a food product.

A useful fat for a sweet oil can be any edible oil useful to prepare a sweet coating for a food product. The oil may be a room temperature solid or a room temperature liquid, and if room temperature solid the oil can be heated for processing and application to a food piece as a component of a sweet oil coating material. Examples of useful oils include hydrogenated and non-hydrogenated vegetable oils such as cottonseed oil, soybean oil, palm oil, palm kernel oil, coconut oil, and mixtures thereof. Other examples include low-trans fatty acid liquid vegetable oils. An exemplary sweet oil can include from about 5 to about 66 weight percent sucrose and from about 34 to about 95 weight percent oil (on a dry basis), e.g., from about 20 to about 50 weight percent sucrose and from about 50 to about 80 weight percent oil.

A sweet oil can be applied to a food piece at any desired amount to produce a dried coating as described herein. According to certain embodiments (e.g., a "sweet oil" method) when applied in combination with a sugars slurry, or other embodiments (e.g., a "combination method") when applied in combination with both a sucrose slurry and a non-sucrose slurry, a sweet oil may be applied to a food piece to provide a sucrose coating weight (dry basis of sucrose in the sweet oil) in a range from 0.01 weight percent to about 5 weight percent sucrose, e.g., from about 0.05 to 2 weight percent sucrose, or from about 0.1 to 1 weight percent sucrose, based on the weight of the coated finished food product (including the weight of the food base and the weight of the dried coating (dried sweet oil and dried sugars slurry).

According to an exemplary method of coating a sweet oil to a food piece, in conjunction with coating a cooked caramel slurry as described herein, a dried caramel coating (with moderate to high sucrose crystallinity) can be formed on a food piece by preparing a sweet oil, preparing a separate cooked caramel slurry, and applying these sweet oil and the slurry to a food piece. As desired, the sweet oil may be applied before the cooked caramel slurry, after the cooked caramel slurry, or at the same time as the cooked caramel slurry either by application of two separate streams (one each for the sweet oil and the slurry) or as a mixture of the sweet oil and the slurry in a single combined stream, the mixture being formed at approximately the time of applying the mixture to the food piece. The cooked caramel slurry is dried after being placed in contact with the sucrose particles of the sweet oil, such that the sucrose particles act as nucleation sites or seed particles for the sucrose in the cooked caramel slurry during the drying process.

Figure 3A:
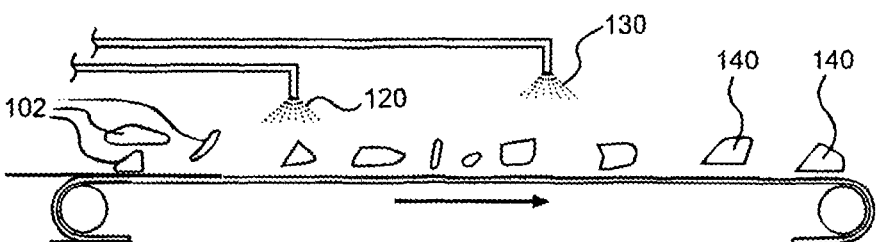
FIG. 3A shows an exemplary process for applying a cooked caramel slurry to a food piece.

Referring now to FIG. 3A, an exemplary method of preparing a dried caramel slurry coating from sweet oil and cooked caramel slurry can include a step of applying a minor amount of sucrose seed particles as part of sweet oil 120 (for example a sweetened liquid edible fat-and-powdered sucrose slurry) to at least a portion of an exterior surface of a food piece (e.g., base) 102 to form a sucrose seed particle and oil-coated base. Subsequently, a cooked caramel slurry 130 can be applied to the sucrose seed particle and oil-coated base, e.g., by spraying cooked caramel slurry 130 through a spray nozzle. See FIG. 3A.

Figure 3B:
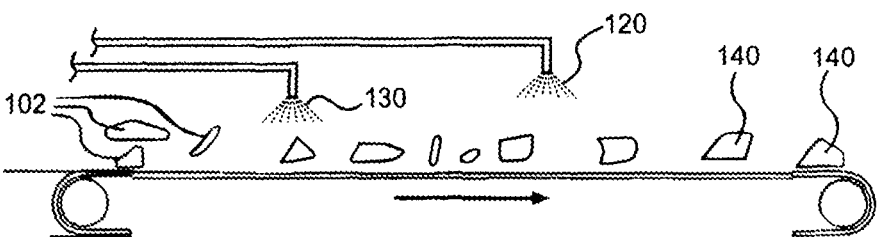
FIG. 3B shows an alternative process for applying a cooked caramel slurry to a food piece.
Figure 3C:
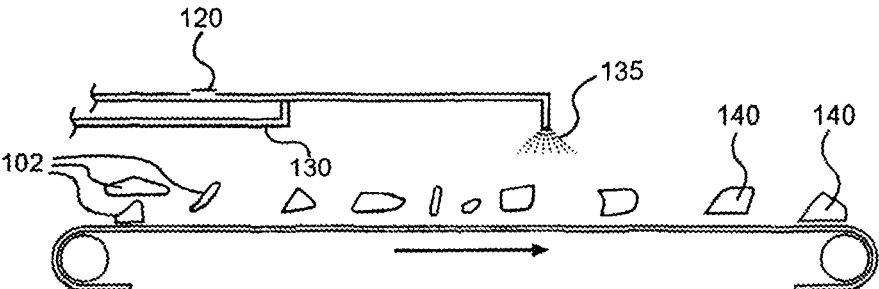
FIG. 3C shows still an alternative process for applying a cooked caramel slurry to a food piece.

FIG. 3B shows an alternate method by which cooked caramel slurry 130 is applied in a first coating step, and a sucrose seed particle and oil composition, e.g., sweet oil 120, is applied immediately afterward, without a step of drying the slurry in between. In an alternate method (not illustrated), a sucrose seed particle and oil composition (e.g., sweet oil) 120 can be applied simultaneously and separately from cooked caramel slurry 130, from different spray nozzles. In yet another alternate method, as illustrated at FIG. 3C, sucrose seed particle and oil composition (sweet oil) 120 can be provided at a coating apparatus, and a separate cooked caramel slurry 130 can also be provided. Before either coating material is applied to base (e.g., food piece) 102, the sucrose seed particle and oil composition (e.g. sweet oil) 120 is combined with the cooked caramel slurry 130, e.g., within a processing line, in a mixing container or reservoir, or by a mixing sprayer head, to form mixture 135 of cooked caramel slurry 130 and sucrose seed particle and oil composition 120. Mixture 135 is then applied as a mixture to base piece (e.g., food piece) 102. Preferably, mixture 135 contains solid (crystalline) sucrose particles when applied, such that the solid sucrose particles can act as seed particles or nucleation sites for enhanced crystallization of sucrose dissolved in cooked caramel slurry 130. By any of these specific arrangements or any other arrangement that effectively places sucrose seed particles in association with dissolved sucrose of the cooked caramel slurry, the sucrose seed particle crystal present with the cooked caramel slurry during drying can cause or promote crystallization of dissolved sucrose present in the cooked caramel slurry, increasing the sucrose crystallinity of the dried coating relative to a comparable dried coating that is dried in the absence of sucrose seed particles.

A sweet oil can include any useful amount of oil and sucrose as described herein or as otherwise useful to allow for even coating of the sweet oil constituents, e.g., powdered sugar. The powdered sugar can be white cane or sugar beet sucrose. Various grinds and sizes of powdered sugar are available and can be used. Good results can be obtained when the powdered sugar has a mean particle size of 100 microns or less, e.g., 50 micron or less, e.g., from about 20 to about 35 microns, when measured using a "volume average" calculation, e.g., using a Microtrac particle size analyzer. An exemplary sweet oil may include a ratio (by weight) of oil to powdered sugar (e.g., sucrose) (oil:powdered sugar) in a range from about 20:1 to 1:2, e.g., from about 4:1 to 1:1, e.g., about 2:1.

The amount of sweet oil applied to the food piece base can be relatively small compared to the amount of coated cooked caramel slurry. Useful amounts can be expressed in terms of the amount (weight) of crystalline sucrose applied to a food piece by application of the sweet oil coating material. Exemplary (non-limiting) application rates of sweet oil can be sufficient to coat crystalline sucrose (e.g., powdered sugar) in an amount in a range from about 5 weight percent to about 0.01 weight percent (dry basis) based on the weight of the finished food product (on a dry basis, including weight of the food base and total weight of the dried coating).

Regarding the use of sucrose seed particles to increase sucrose crystallinity in a dried cooked caramel coating, this technique can be useful to increase sucrose crystallinity of a dried cooked caramel slurry regardless of the moisture content of the cooked caramel slurry or how the cooked caramel slurry has been prepared (e.g., with or without using either a closed-system cooking step, or an ambient pressure cooking step without boiling the slurry). That is, a cooked caramel slurry applied in conjunction with sucrose seed particles may be a slurry prepared as described herein, by steps that include at least a portion of a total amount of cooking being performed in a closed system or in an open system without boiling, to produce a cooked caramel slurry that has a relatively high moisture content. Alternately, however, in a method of applying a cooked caramel slurry to a food piece with sucrose particles to increase sucrose crystallinity of a dried cooked caramel slurry coating, the cooked caramel slurry may be prepared by any useful method; it may be prepared by cooking in a completely open system that results in a reduced moisture content, and it may be applied with the sucrose seed particles either at a low moisture content (e.g., from about 2 to about 4 weight percent moisture based on total slurry weight), or (optionally by being diluted with water) at a higher moisture content (e.g., from about 5 to about 20 weight percent moisture based on total slurry weight).

According to certain described embodiments, the cooked caramel slurry can be applied to a food bases food piece and dried to produce a dried cooked caramel slurry coating. A food piece base can be of any dried food type that may desirably be provided with a caramel coating. For example, a food piece can include or be in the form of dried a cereal piece or a snack food.

The presently described caramel slurries can find particular suitability for coating onto a surface of a pre-sweetened Ready-to-Eat ("RTE") breakfast cereal. RTE cereal products can include, for example, a cereal base in the form of pieces or quantities of puffed or unpuffed grains, cereal pieces derived from grain such as flours and starches, and the like. A cereal base as a food piece can be one or more common shaped and sized pieces of RTE cereal, whether in the form of flakes, puffs, shreds, biscuits, O's, letters, figurines, nuggets, and mixtures thereof, fabricated from a cooked cereal dough. Cereal pieces can also or alternately be in the form of puffed pieces of wheat, rice, corn, etc. In some embodiments the pieces are pieces of dough after cooking and drying to a moisture content of about 1 to about 5 percent by weight after drying.

Any conventional cereal pieces and methods of cereal preparation can be used herein to provide a cereal base as a food piece. The food and cereal arts contain many descriptions of cereal pieces and methods of their preparation. Examples can be found, for example, in U.S. Pat. Nos. 3,464,827; 3,600,193; 3,246,990; and 3,687,687.

A cooked cereal dough can be prepared by blending dry ingredients together with water and cooking to gelatinize starchy components and to develop a cooked flavor. The cooked material can be mechanically worked to form a cooked cereal dough. The cooking and mechanical work can occur simultaneously or sequentially. The dry ingredients can also include various additives such as sugar or other sweetener, salt and mineral salts, e.g., trisodium phosphate, and starches. In addition to water, various liquid ingredients such as corn (maize) or malt syrups can be added.

A preferred component of a cereal composition as described is a starchy cereal component. The starchy cereal component can comprise any conventional starchy cereal or, synonymously, farinaceous material, for use in a ready-to-eat cereal. Exemplary suitable starchy cereals include cereal grains, cut grains, grits, and flours, derived or prepared from wheat, rice, corn, oats, barley, rye, triticale, other cereal grains, and mixtures thereof. The flours can be whole flours or flour fractions such as with the germ fraction or husk fraction removed or, alternatively, brans. A starchy cereal component can constitute from about 40 to about 99 weight percent (dry basis) of a cooked cereal dough composition, e.g., from about 75 to about 95 weight percent (on a dry basis) of the cooked cereal dough composition, or from about 80 to about 95 weight percent (on a dry basis). In certain embodiments, all or a portion of the starchy cereal component can be provided in the form of whole grain flours.

A cooked cereal dough can include from about 10 to about 55 weight percent moisture. The amount of moisture depends in part upon the particular cereal ingredients, desired finished products, cooking equipment, and techniques used. A dried finished (un-coated) cereal product prepared from a cooked cereal dough product can include from about 3 to about 12 weight percent moisture, e.g., from about 4 to about 6 weight percent moisture, based on the total weight of the dried finished cereal product.

If desired, a cereal dough composition for use as described can additionally include sugar or non-sugar sweetener in an amount in a range from about 0.1 to about 15 weight percent (dry weight), which includes, for example, nutritive carbohydrate sweetening agents; preferred amounts of sugar (e.g., sucrose) or non-sugar sweetener can be in a range from about 0.5 to about 5 weight percent (dry basis). Useful herein as the sugar is sucrose. However, a sugar can alternately or additionally include fructose, maltose, dextrose, honey, fruit juice solids, brown sugar, and the like. In addition to providing desirable sweetness, the sugar additionally beneficially affects the cereal color and texture. As an example for an RTE cereal product, a cereal can include 2 weight percent or less sugar by weight (dry basis). If desired, a base piece can be sweetened by high potency sweetener.

According to certain embodiments of ready-to-eat cereals, a cereal base can exhibit a low fat level, e.g., the cereal may exclude added or absorbed fat ingredients, although minor amounts of added fat in the form of processing agents such as emulsifiers or flavor ingredients can be present. Thus, the total fat or lipid component can be relatively low. The fat content may be provided entirely from the native fat associated with a starchy cereal component. According to particular embodiments, total added fat (i.e., non-native fat from constituents) to a cereal can be less than about 6 weight percent, for example less than about 2 weight percent (on a dry basis). According to some examples an RTE cereal can be substantially free of fat incorporated into the cooked cereal dough.

If desired, a cereal dough composition can additionally include any of a variety of ingredients designed to improve the aesthetic, organoleptic, nutritional, or nutraceutical qualities of the cereal. These adjuvant materials can include vitamins, minerals, colors, flavors, high potency sweetener, and mixtures thereof. The precise ingredient concentration can vary in known manner. In certain embodiments, an RTE cereal can be fortified with bioavailable sources of calcium, iron, riboflavin, and the like. Generally, however, such materials can each make up from about 0.01 weight percent to about 2 weight percent (dry basis) of a cereal composition.

The described raw cereal components and other ingredients can be cooked and worked to form a cooked cereal dough by conventional cooked cereal dough preparation methods. The total moisture addition is controlled to provide a cooked cereal comprising about 10 weight percent to about 35 weight percent moisture, preferably from about 25 to about 35 weight percent moisture. The cereal dough cooking step can be practiced using a batch, atmospheric cooker, or a low pressure extruder cooker, e.g., equipped with a conditioner precooker or a twin screw extruder. The cereal can be cooked by any useful method, such as with steam and a sufficient amount of added water, for a time and at a temperature sufficient to gelatinize starch and develop desired levels of cooked cereal flavor.

The cereal can be formed into any of a variety of common RTE cereal forms including spheres, shreds, biscuits, flakes; "O's"; a novelty shape (e.g., Celtic runes for products such as marketed under the brand name of "Lucky Charms"); or any other common or developed RTE cereal or cereal-based snack product form, shape, or size, such as saucers or scooped shaped configurations. One specific example of a cereal piece useful as described herein is a graham flavored planar square.

A great number of RTE cereals and snack products are prepared from cooked cereal doughs that are formed into pellets. The cooked cereal dough can be fed to a pellet former to form pellets. For example, in the preparation of RTE cereals in flake form, the pellets are sized to have a pellet count of about 35 to 50 per 10 grams and a moisture content of 16 to 20 weight percent. The pellets can be partially dried to moisture contents of about 18 to 20 weight percent. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

The size of base pieces can vary. In some embodiments especially suitable for use as RTE breakfast cereals, base pieces can range from about 35 to 65 pieces per 10 grams. In some embodiments base pieces are provided as dried pieces of cooked cereal dough in the form of planar pieces (such as disks or squares having opposed major faces) having surfaces of about 100-300 mm² and measuring about 0.5-2.0 mm in thickness. For snack products the pieces can range in size from 1 to 5 grams each.

We claim:

1. A cooked caramel-coated food piece composition comprising about 40 to about 95 weight percent food piece, and about 5 to about 60 weight percent cooked caramel coating over at least a portion of the food piece, wherein the cooked caramel coating has sucrose crystallinity of greater than 10 percent.

2. The cooked caramel-coated food piece composition according to claim 1 wherein the composition comprises a plurality of cooked ready-to-eat cereal pieces, the coating being located over a portion of the plurality of pieces.

3. The cooked caramel-coated food piece composition according to claim 1 wherein the cooked caramel coating comprises soluble solids and from 35 to 80 weight percent sucrose on a dry basis and exhibits a sucrose to soluble solids ratio in a range from 0.6 to 0.85.

4. The cooked caramel-coated food piece composition according to claim 1 wherein the cooked caramel coating comprises from 30 to 80 weight percent sucrose, from 5 to 25 weight percent non-sucrose sugar, from 5 to 25 weight percent fat, and from 0.1 to 5 weight percent protein, on a total solids basis.

5. The cooked caramel-coated food piece composition according to claim 1 wherein the cooked caramel coating has a crystallinity of greater than 20 percent.

6. The cooked caramel-coated food piece composition according to claim 1 wherein the cooked caramel coating has a crystallinity of greater than 40 percent.

7. The cooked caramel-coated food piece composition according to claim 6 wherein the cooked caramel coating comprises a sweet oil coating.

8. The cooked caramel-coated food piece composition according to claim 1 wherein the cooked caramel coating comprises an undiluted cooked caramel slurry including:

from 30 to 80 weight percent sucrose, from 5 to 25 weight percent non-sucrose sugar, from 5 to 25 weight percent fat, from 0.1 to 5 weight percent protein, each on a total solids basis, and at least 5 weight percent water, wherein the slurry is undiluted, the water being also present during cooking of the slurry.

9. An undiluted cooked caramel slurry comprising:

from 30 to 80 weight percent sucrose, from 5 to 25 weight percent non-sucrose sugar, from 5 to 25 weight percent fat, and from 0.1 to 5 weight percent protein, each on a total solids basis, and at least 5 weight percent water, wherein the slurry is undiluted, the water being also present during cooking of the slurry.

10. The undiluted cooked caramel slurry according to claim 9 having a viscosity of less than about 2000 centipoise as measured using a TA Instruments AR-G2 Rheometer fitted with 40 millimeter parallel plate geometry on a peltier plate temperature control, being run at a shear rate of 10 sec-1 and reading the viscosity at 30 seconds, at 200 degrees Fahrenheit.

11. The undiluted cooked caramel slurry according to claim 9 comprising a mixture of slurry ingredients comprising from 30 to 80 weight percent sucrose, from 5 to 25 weight percent non-sucrose sugar syrup, from 5 to 30 weight percent butter, oil, or a combination thereof, and from 5 to 25 weight percent milk solids, each on a total solids basis.

12. The undiluted cooked caramel slurry according to claim 9, wherein the cooked caramel slurry has a moisture content in a range from 9.5 to 20 percent.

13. In combination, a food piece and the undiluted cooked caramel slurry according to claim 9, wherein the undiluted cooked caramel slurry is present as a cooked caramel coating on a surface of the food piece.

14. The combination of the food piece and the undiluted cooked caramel slurry according to claim 13, wherein the food piece has a composition comprising:

about 40 to about 95 weight percent food piece, and about 5 to about 60 weight percent cooked caramel coating over at least a portion of the food piece, wherein the cooked caramel coating has a sucrose crystallinity of greater than 10 percent.

15. The combination of the food piece and the undiluted cooked caramel slurry according to claim 13, wherein the food piece is a cooked ready-to-eat cereal piece, with the cooked caramel coating being applied over at least a portion of the cooked ready-to-eat cereal piece.

* * * * *